(12) United States Patent
Yoshida

(10) Patent No.: US 11,803,615 B2
(45) Date of Patent: Oct. 31, 2023

(54) GENERATING 3D TRAINING DATA FROM 2D IMAGES

(71) Applicant: NEC Corporation, Tokyo (JP)

(72) Inventor: Noboru Yoshida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 226 days.

(21) Appl. No.: 17/414,025

(22) PCT Filed: Mar. 4, 2019

(86) PCT No.: PCT/JP2019/008441
§ 371 (c)(1),
(2) Date: Jun. 15, 2021

(87) PCT Pub. No.: WO2020/178957
PCT Pub. Date: Sep. 10, 2020

(65) Prior Publication Data
US 2022/0051054 A1 Feb. 17, 2022

(51) Int. Cl.
| | | |
|---|---|---|
| *G06F 18/214* | (2023.01) | |
| *G06V 40/10* | (2022.01) | |
| *G06V 10/40* | (2022.01) | |
| *G06V 40/20* | (2022.01) | |
| *G06F 18/25* | (2023.01) | |
| *G06V 10/774* | (2022.01) | |

(52) U.S. Cl.
CPC .......... *G06F 18/214* (2023.01); *G06F 18/25* (2023.01); *G06V 10/40* (2022.01); *G06V 10/774* (2022.01); *G06V 40/10* (2022.01); *G06V 40/23* (2022.01)

(58) Field of Classification Search
CPC ....... G06F 18/214; G06F 18/25; G06V 10/40; G06V 10/774; G06V 40/10; G06V 40/23
See application file for complete search history.

(56) References Cited

U.S. PATENT DOCUMENTS

| | | | |
|---|---|---|---|
| 2007/0104351 A1 | 5/2007 | Yang et al. | |
| 2010/0284601 A1* | 11/2010 | Rubner .................. | A61B 6/583 378/62 |
| 2015/0348257 A1* | 12/2015 | Sankaranarayanan .... | G06T 7/70 382/103 |
| 2018/0307946 A1 | 10/2018 | Kuroda | |
| 2019/0051057 A1* | 2/2019 | Sommerlade ........... | G06T 19/20 |

(Continued)

FOREIGN PATENT DOCUMENTS

| | | |
|---|---|---|
| JP | 2009514111 A | 4/2009 |
| JP | 2010963066 A | 3/2010 |

(Continued)

OTHER PUBLICATIONS

JP Office Action for JP Application No. 2021-503293, dated Nov. 29, 2022 with English Translation.

(Continued)

*Primary Examiner* — Casey L Kretzer

(57) ABSTRACT

An image processing device includes an extraction unit configured to extract a two-dimensional feature regarding a part of a person in an image, a conversion unit configured to convert the two-dimensional feature into a three-dimensional feature regarding a human body structure, and a training data generation unit configured to generate training data using the three-dimensional feature and a label indicating a physical state of the person.

10 Claims, 18 Drawing Sheets

(56) References Cited

U.S. PATENT DOCUMENTS

2020/0007467 A1    3/2020  Masui et al.
2020/0184721 A1*  6/2020  Ge ........................ G06T 17/20

FOREIGN PATENT DOCUMENTS

| JP | 2010211732 A | 9/2010 |
|----|--------------|--------|
| JP | 2013120556 A | 8/2013 |
| JP | 2018-055619 A | 4/2018 |
| JP | 2018067294 A | 4/2018 |
| JP | 2018129007 A | 8/2018 |
| WO | 2017073373 A1 | 5/2017 |
| WO | 2017/141344 A1 | 8/2017 |
| WO | 2018207351 A1 | 11/2018 |

OTHER PUBLICATIONS

International Search Report for PCT Application No. PCT/JP2019/008441, dated May 7, 2019.

English translation of Written opinion for PCT Application No. PCT/JP2019/008441, dated May 7, 2019.

Chunyu Wang et al., "Robust Estimation of 3D Human Poses from a Single Image", CBMM Memo No. 013, Center far Brains, Minds & Machines, Jun. 10, 2014, pp. 4322-4329, [online], https://arxiv.org/pdf/1406.2282.pdf.

Yuchen Zhang et af., "moving image data automatic generation for large person behavior DB construction", The 24th Symposium on Sensing via Image, Japanese Domestic Conference Paper 2018-00753-090, Jun. 2018, pp. 1-4, SSII 2018, IS3-25, SO3-IS3-25.

* cited by examiner

BACKGROUND IMAGE

TWO-DIMENSIONAL FEATURE INFORMATION

THREE-DIMENSIONAL FEATURE INFORMATION

PERSON MODEL

PERSON IMAGE

TRAINING DATA
LABEL:RUNNING

GENERATING 3D TRAINING DATA FROM 2D IMAGES

This application is a National Stage Entry of PCT/JP2019/008441 filed on Mar. 4, 2019, the contents of all of which are incorporated herein by reference, in their entirety.

TECHNICAL FIELD

The present invention relates to a device, a method, and a program recording medium that generate training data necessary for a system that learns and detects a behavior of a person.

BACKGROUND ART

There has been an increasing need for detecting a behavior of a person from a video of a surveillance camera, or the like. For example, by detecting a person who is unsteadily walking on a platform of a station because the person is getting drunk or the like, predicting a fall of the person, and protecting the person, it is possible to prevent an accident causing injury or death. By analyzing information such as which product a customer has picked up in a retail store or the like, it is possible to use the information for product development.

PTL 1 discloses that it is estimated that a posture of motion capture data with the highest similarity with a posture of a subject in a captured image among motion capture data regarding the posture of the subject is the posture of the subject in the captured image.

Accuracy of the detection technique as described above has been improved by machine learning such as Deep learning.

However, in order to improve the accuracy of the detection technique by the machine learning such as Deep learning, a large amount of training data including an image or a moving image regarding a physical state of a person such as a posture or a behavior of the person and a correct answer label indicating a type of the behavior of the person is required.

Each of PTLs 2 to 4 discloses a technique regarding generation of training data.

PTL 2 discloses that generation of uncomplete training data is prevented using neglect evaluation indicating that input data is excluded from a learning target in addition to positive evaluation indicating that content of the input data matches a label and negative evaluation indicating that the content of the input data does not match the label when the training data is generated.

PTL 3 discloses that training data is generated by using a computer graphics (CG) image generated by using skeleton shape information of a human body obtained by using a motion capturing shape.

PTL 4 discloses that necessity to artificially generate training data is determined according to a data amount for each behavior in a training dataset and the training data sets covering various behaviors are created.

CITATION LIST

Patent Literature

[PTL 1] JP 2013-120556 A
[PTL 2] WO 2017/073373 A
[PTL 3] JP 2010-211732 A
[PTL 4] JP 2018-67294 A

SUMMARY OF INVENTION

Technical Problem

In the related art, when the training data is created, special equipment or a special device such as a motion capture system is used. Therefore, there has been a problem in that a cost at the time when the training data is created increases.

The present invention has been made in consideration of the above problems, and an object of the present invention is to generate training data at a low cost.

Solution to Problem

According to a first viewpoint of the present invention, an image processing device is provided that includes extraction means for extracting a two-dimensional feature regarding a part of a person in an image, conversion means for converting the two-dimensional feature into a three-dimensional feature regarding a human body structure, and training data generation means for generating training data using the three-dimensional feature and a label indicating a physical state of the person.

According to a second viewpoint of the present invention, an image processing method is provided that includes extracting a two-dimensional feature regarding a part of a person in an image, converting the two-dimensional feature into a three-dimensional feature regarding a human body structure, and generating training data using the three-dimensional feature and a label indicating a physical state of the person.

According to a third viewpoint of the present invention, a recording medium is provided that records a program for causing a computer to execute processing including processing for extracting a two-dimensional feature regarding a part of a person in an image, processing for converting the two-dimensional feature into a three-dimensional feature regarding a human body structure, and processing for generating training data using the three-dimensional feature and a label indicating a physical state of the person.

Advantageous Effects of Invention

According to the present invention, training data for reproducing a behavior of a person is created using a person feature obtained from an image or a moving image obtained by performing imaging using a normal visible light camera without using special equipment or a special device such as a motion capturing.

As a result, it is possible to create training data regarding a behavior of a person at a low cost.

EXAMPLE EMBODIMENT

Hereinafter, example embodiments will be specifically described with reference to the drawings.

First Example Embodiment

Figure 1:
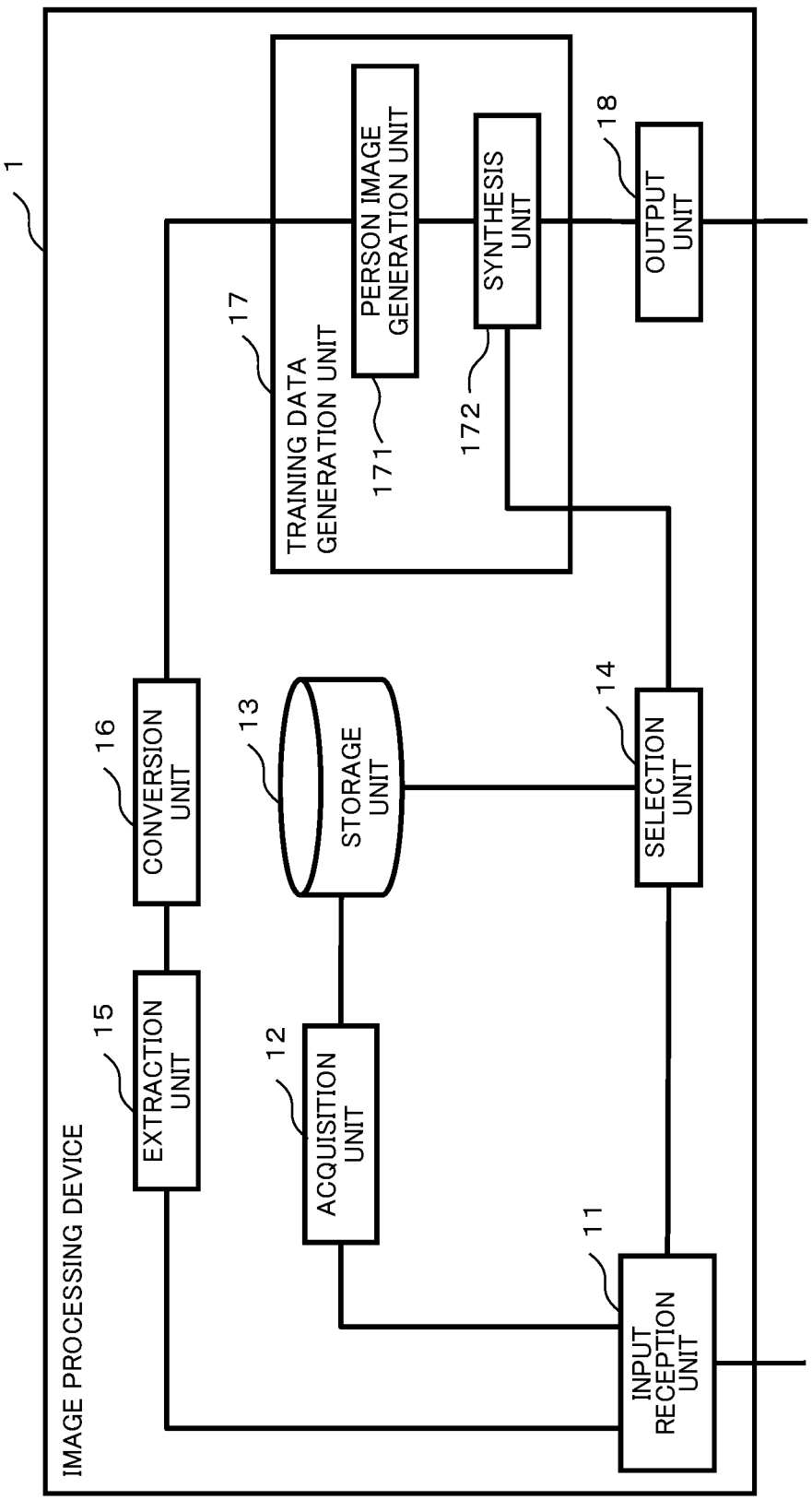
FIG. 1 is a diagram illustrating a configuration of an image processing device according to a first example embodiment.

FIG. 1 is a diagram illustrating a configuration of an image processing device 1 according to the present example embodiment.

The image processing device 1 illustrated in FIG. 1 includes an input reception unit 11, an acquisition unit 12, a storage unit 13, a selection unit 14, an extraction unit 15, a conversion unit 16, a training data generation unit 17, and an output unit 18.

The input reception unit 11 receives inputs of images captured by one or more imaging devices such as cameras (not illustrated) and a label indicating a physical state of a person in the image. The input reception unit 11 may receive the input of the label from a user or a label that is automatically generated. The input reception unit 11 may sequentially receive time-series successive images. The input reception unit 11 may receive an input of a moving image, not an image.

The input reception unit 11 outputs at least the image of the input information to the acquisition unit 12 and the extraction unit 15 and outputs at least the label to the selection unit 14.

The acquisition unit 12 acquires a background image from the input image. The acquisition unit 12 outputs the acquired background image to the storage unit 13.

The storage unit 13 stores the background image input from the acquisition unit 12.

Figure 2:
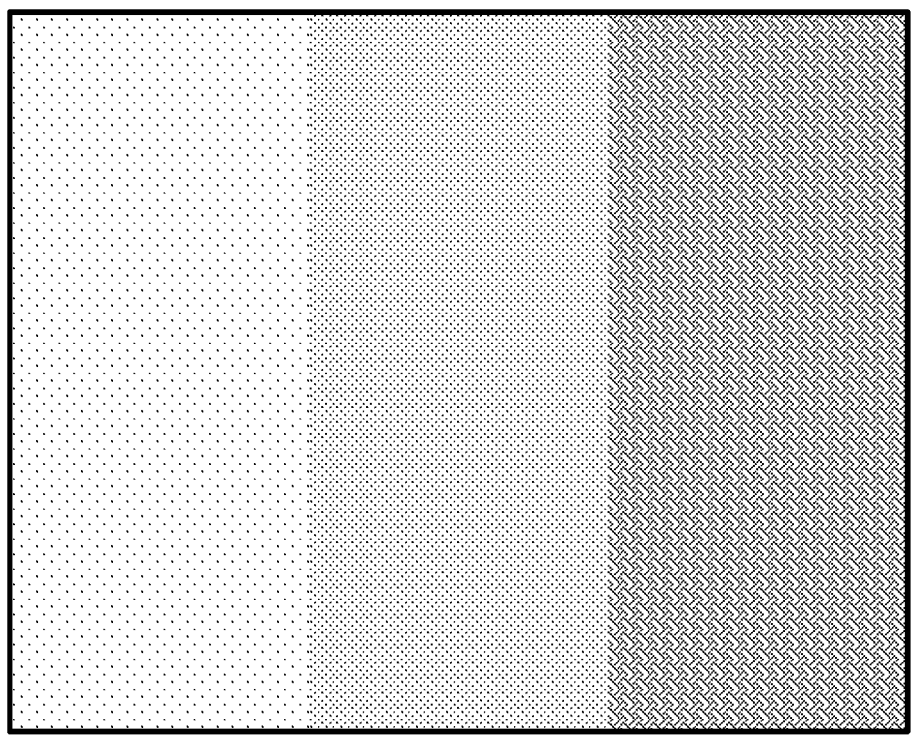
FIG. 2 is a diagram illustrating an example of a background image held by a storage unit according to the first example embodiment.

FIG. 2 is a diagram illustrating an example of the background image stored in the storage unit 13. The storage unit 13 stores the plurality of background images that can be used for generation of training data. The storage unit 13 may store the background images in advance.

The selection unit 14 selects the background image used for generation of the training data from among the plurality of background images stored in the storage unit 13.

The selection unit 14 may select an appropriate background image according to the input label. For example, it is preferable for the selection unit 14 to select a background like a green grassland if the label is a golf club swing and to select a background such as a station or a road if the label is a wobble. This selection may be manually performed or automatically performed according to a preset algorithm. The selection unit 14 may select a background image of an image captured under an imaging condition similar to an imaging condition of an imaging device that has captured the input image.

The extraction unit 15 extracts a two-dimensional feature of the person in the input image. The two-dimensional feature is information regarding a body part of the person in the image or the moving image.

Figure 3:
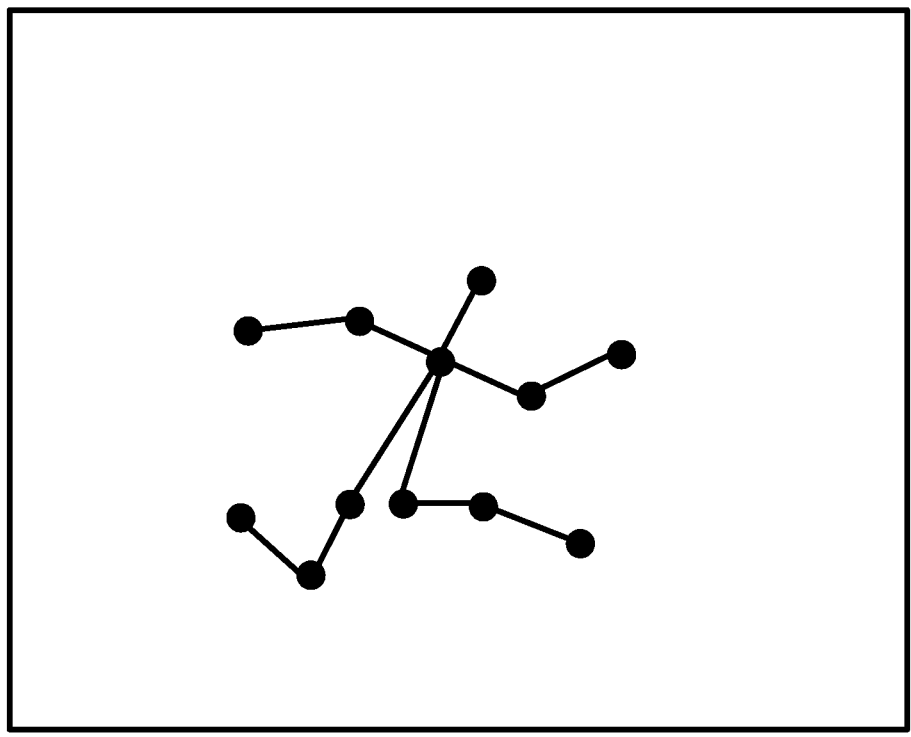
FIG. 3 is a diagram illustrating an example of a two-dimensional feature extracted by the image processing device according to the first example embodiment.

FIG. 3 is a diagram illustrating an example of a two-dimensional feature. The two-dimensional feature illustrated in FIG. 3 is information representing a skeletal structure of the person in the image.

The two-dimensional feature is not limited to the information representing the skeletal structure of the person in the image and may be, for example, positional coordinates of the body part such as each joint, the head, the hand, or the foot of the person in the image. Alternatively, for example, the two-dimensional feature may be information regarding a vector for connecting between the joints of the person in the image or may be information regarding a silhouette indicating where the person exists in the image.

Figure 4:
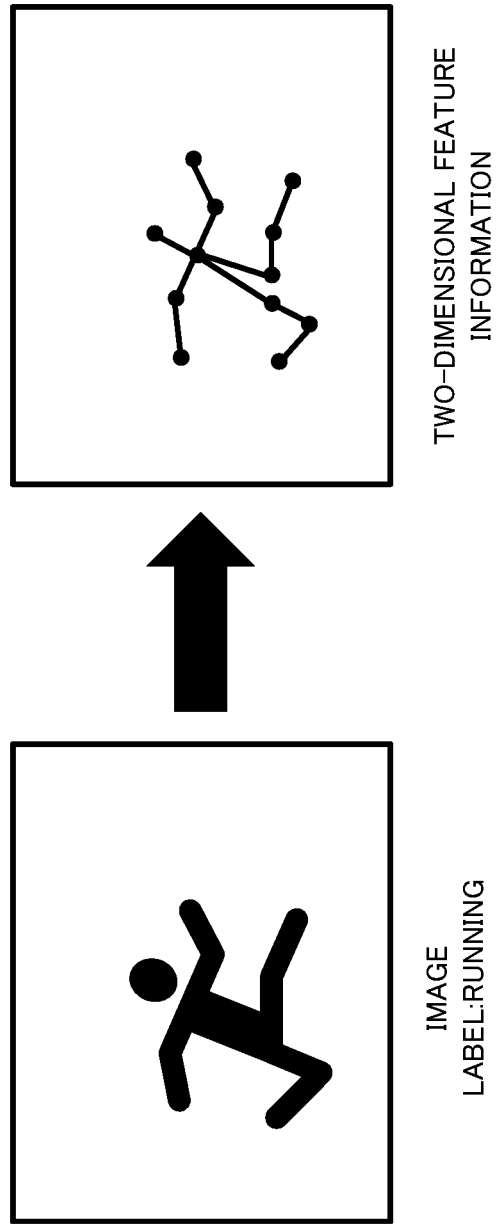
FIG. 4 is a diagram illustrating an example in which the image processing device according to the first example embodiment extracts the two-dimensional feature from an image.

FIG. 4 is a diagram illustrating an example in which the extraction unit 15 extracts a two-dimensional feature from an image.

For example, the extraction unit 15 extracts a two-dimensional feature from an image using a computer that has performed machine learning. Specifically, the extraction unit 15 extracts the positional coordinates of the joint of the person in the input image using a model generated by machine learning. The model is generated by machine learning using a plurality of pieces of data including the image and the positional coordinates of the joint of the person in the image.

The extraction unit 15 uses a model generated by Deep learning, for example. Alternatively, the extraction unit 15 may use a model generated by machine learning using a neural network other than Deep learning. Alternatively, the extraction unit 15 may use a model generated by machine learning other than the neural network, for example, may use a model generated by a support vector machine (SVM).

Alternatively, the extraction unit 15 may be configured to accept manual extraction of the two-dimensional feature.

In a case where a part of the two-dimensional feature is not extracted due to overlapping, hiding, or the like in the image, the extraction unit 15 may extract another two-dimensional feature used to supplement the two-dimensional feature from an image different from the above image using an optional method.

As a method for supplementing the two-dimensional feature, for example, the extraction unit 15 may receive another two-dimensional feature used to supplement the two-dimensional feature by a manual input or may supplement the two-dimensional feature using the another two-dimensional features extracted from preceding and succeeding images in time series.

The extraction unit 15 outputs the extracted two-dimensional feature to the conversion unit 16.

The conversion unit 16 converts the two-dimensional feature input from the extraction unit 15 into a three-dimensional feature. The three-dimensional feature is information regarding a human body structure in a three-dimensional space of the person in the image.

Figure 5:
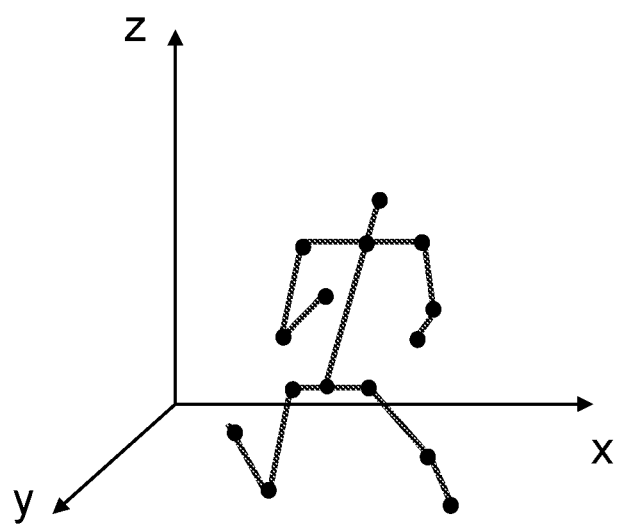
FIG. 5 is a diagram illustrating an example of a three-dimensional feature obtained by conversion by the image processing device according to the first example embodiment.

FIG. 5 is a diagram illustrating an example of a three-dimensional feature. The three-dimensional feature illustrated in FIG. 5 is information representing a skeletal structure of a person in the three-dimensional space.

The three-dimensional feature is not limited to the information representing the skeletal structure of the person in the three-dimensional space and may be, for example, positional coordinates of the body part such as each joint, the head, the hand, or the foot of the person in the image in the three-dimensional space. Alternatively, for example, the three-dimensional feature may be information regarding a vector for connecting the joints of the person in the three-dimensional space or may be information regarding a silhouette indicating a region where the person exists in the three-dimensional space.

Figure 6:
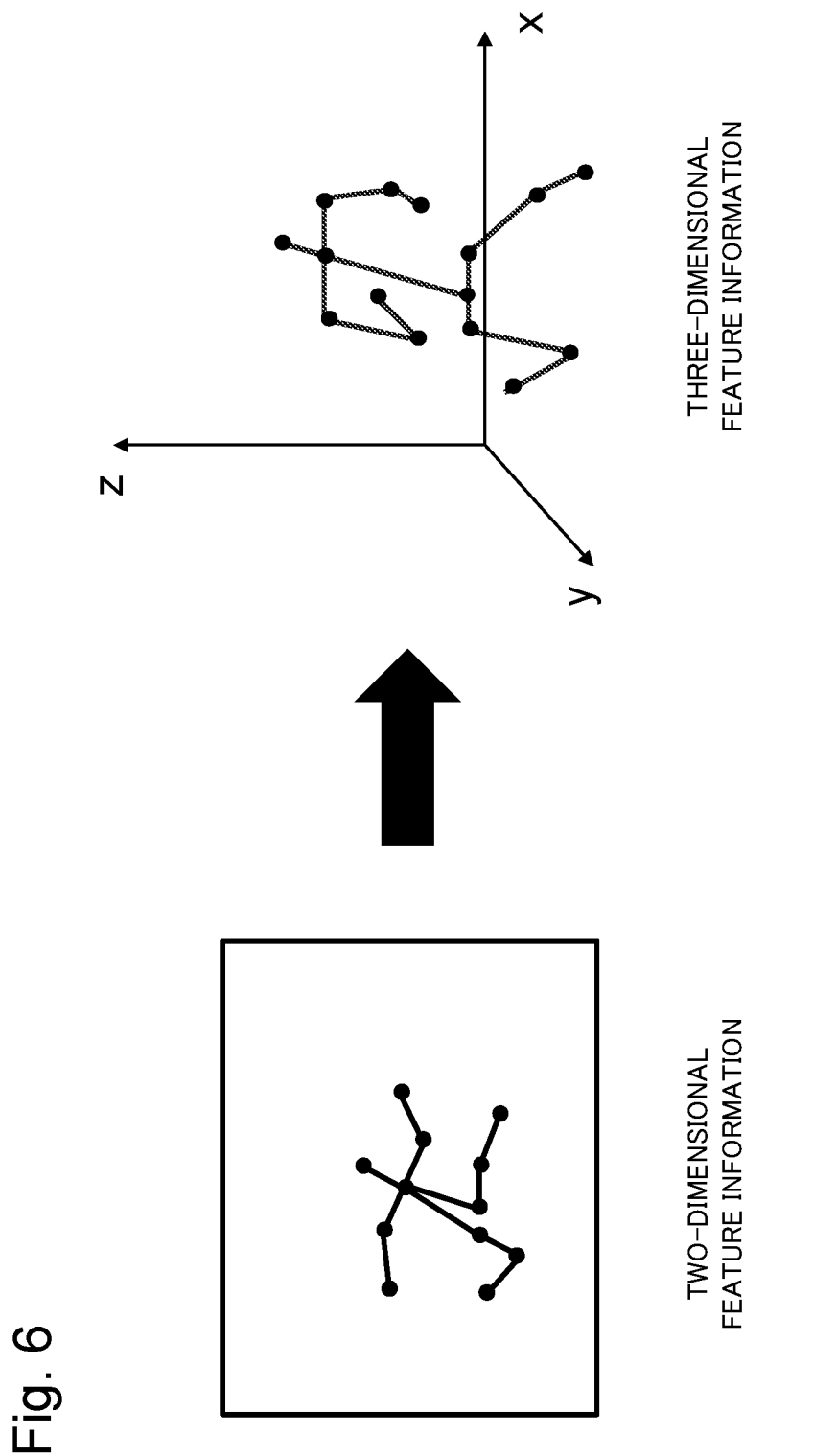
FIG. 6 is a diagram illustrating an example in which the image processing device according to the first example embodiment converts the two-dimensional feature into the three-dimensional feature.

FIG. 6 is a diagram illustrating an example in which the conversion unit 16 converts a two-dimensional feature into a three-dimensional feature.

Specifically, the conversion unit 16 converts a two-dimensional feature into a three-dimensional feature using a computer that has performed machine learning.

For example, the conversion unit 16 converts the positional coordinates of the joint extracted from the input image into positional coordinates in the three-dimensional space using a model generated by machine learning. The model is obtained by machine learning using a plurality of pieces of data including the positional coordinates of the joint of the person in the image and the positional coordinates of the joint of the person in the three-dimensional space.

The conversion unit 16 uses, for example, a model generated by Deep learning. Alternatively, the conversion unit 16 may use a model generated by machine learning using a neural network other than Deep learning. Alternatively, the conversion unit 16 may use a model generated by machine learning other than the neural network, for example, may use a model generated by a support vector machine (SVM).

The conversion unit 16 outputs the three-dimensional feature to the training data generation unit 17.

The training data generation unit 17 includes a person image generation unit 171 and a synthesis unit 172.

The person image generation unit 171 generates a person image on the basis of the three-dimensional feature input from the conversion unit 16 and a person model. The person image generation unit 171 may hold the person model in advance or may receive an input from outside.

Figure 7:
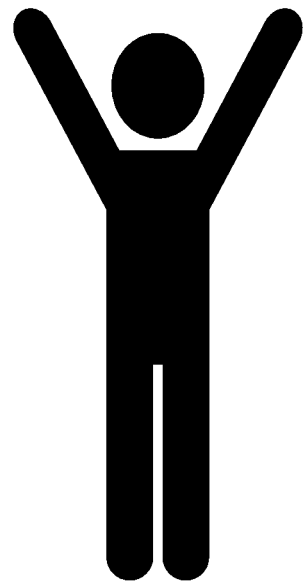
FIG. 7 is a diagram illustrating an example of a person model used when a person image generation unit according to the first example embodiment generates a person image.

FIG. 7 is a diagram illustrating an example of a person model used when the person image generation unit 171 generates a person image. The person model is, for example, a CG model of a person generated on a computer.

As a person model, variety of models of the attributes may be prepared such as an age, sex, body shape, upper body clothing (suits, shirts, or the like), upper body clothing color (red, blue, yellow, black, white, or the like), skin color, hairstyle, hair color, lower body clothing (jeans, skirts, or the like), lower body clothing color (red, blue, yellow, black, white, or the like), footwears (leather shoes, sneakers, or the like), footwear color (red, blue, yellow, black, white, or the like), or the like.

Figure 8:
FIG. 8 is a diagram illustrating an example of a person image generated by a person image generation unit according to a modification of the first example embodiment.

FIG. 8 is a diagram illustrating an example of the person image generated by the person image generation unit 171. FIG. 8 is a person image of a person who is acting "running".

Specifically, for example, the person image generation unit 171 applies the three-dimensional feature to a person model generated with CG and renders the applied three-dimensional feature as an image obtained by performing imaging from an optional direction and distance. As a result, the person image generation unit 171 generates an image of a person who behaves in the same way as a behavior indicated by an input label. At this time, for example, the person image generation unit 171 extracts a camera parameter, a position, a direction, or the like of the person with respect to a camera from the input image and uses the extracted parameters for generation of the person image in such a way as to generate a person image in which the person in the input image is replaced with a person model with the same posture.

Figure 9:
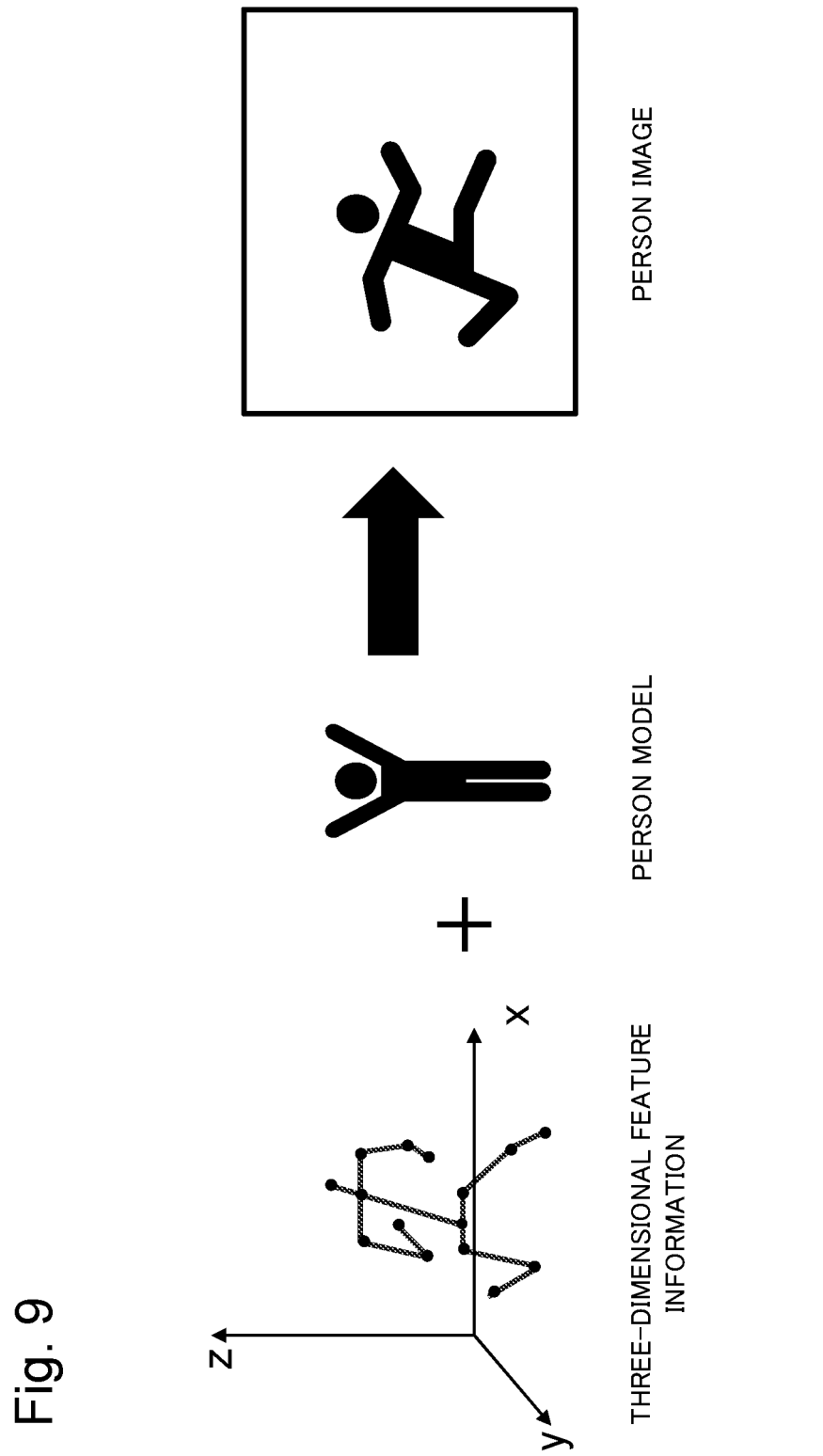
FIG. 9 is a diagram illustrating an example in which the person image generation unit according to the first example embodiment generates a person image.

FIG. 9 is a diagram illustrating an example in which the person image generation unit 171 generates a person image. For example, as illustrated in FIG. 9, the person image generation unit 171 applies a three-dimensional feature to a person model in such a way as to generate a person image of a person who is acting "running".

The person image generation unit 171 may generate the person image on the basis of an imaging condition of an imaging device that has captured the input image and a positional relationship between the person in the image and the imaging device.

The person image generation unit 171 may generate a person image using a person model selected on the basis of the input label. For example, in a case where a person image is generated on the basis of the label of "running", the person image generation unit 171 generates a person image using a person model of a young person who is likely to act "running", not an elderly person who is unlikely to act "running". In a case of a behavior of "walking with a cane", the person image generation unit 171 generates a person image using a person model of an elderly person generated with CG. By using the person model selected on the basis of the label by the person image generation unit 171, it is possible to generate training data with highly accuracy regarding behavior analysis using machine learning.

The person image generation unit 171 may select a person model according to a use scene of a computer that has performed learning using the generated training data. For example, in a case where the person image generation unit 171 uses a video obtained by imaging a place where a large number of office workers walk, the person image generation unit 171 may perform selection according to a fixed rule set to increase a possibility for selecting a person model wearing a suit. For example, in a case where the person image generation unit 171 uses a video imaged in a nursing home, the person image generation unit 171 may perform selection according to a fixed rule set to increase a possibility for selecting an elderly person model. For example, the person image generation unit 171 may observe an attribute of the imaged person as statistical information in advance and determine a variation of the person model on the basis of the information.

The person image generation unit 171 may separately recognize ornaments worn by a person in the image (mask, hat, or the like), belongings (bag, umbrella, backpack, or the like), and other tools and generate a person image using a person model to which CG of these tools is added.

The person image generation unit 171 outputs the generated person image to the synthesis unit 172.

The synthesis unit 172 generates training data by synthesizing the background image input from the selection unit 14 and the person image input from the person image generation unit 171. The training data is data used when the neural network is learned through machine learning. The training data includes an image and a label indicating a behavior of a person in the image.

Figure 10:
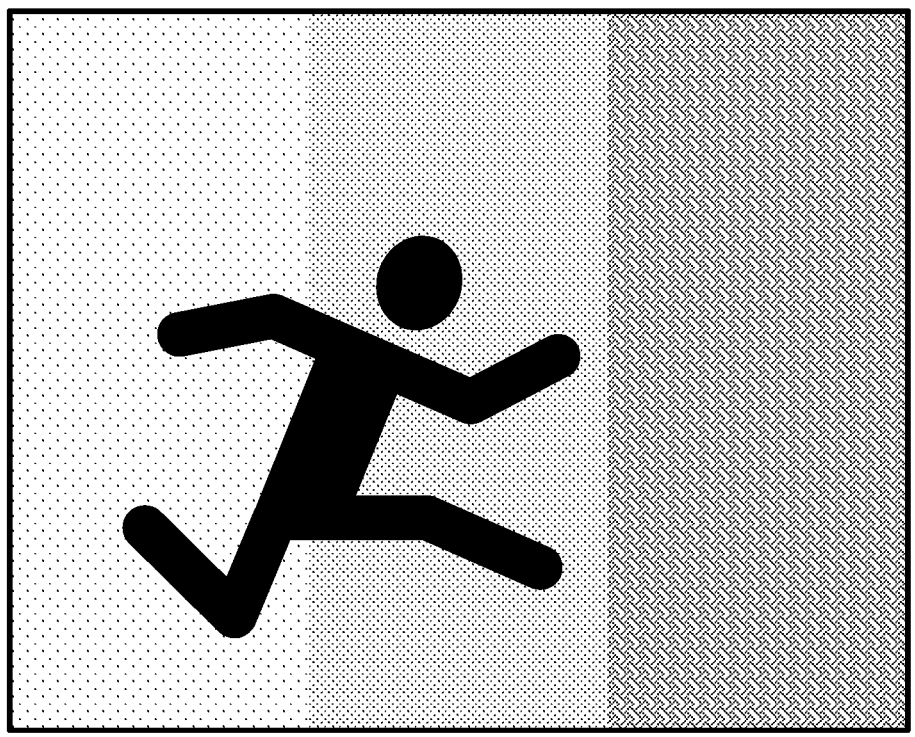
FIG. 10 is a diagram illustrating an example of training data generated by the image processing device according to the first example embodiment.

FIG. 10 is an example of the training data generated by the synthesis unit 172. The training data illustrated in FIG. 10 is training data used to learn a behavior of "running".

Figure 11:
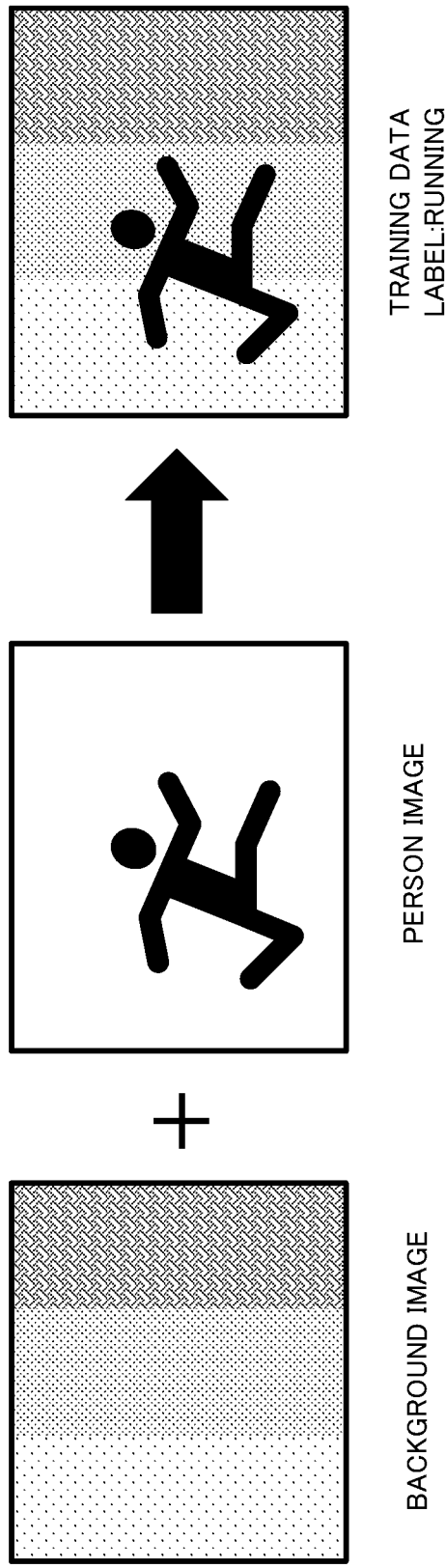
FIG. 11 is a diagram illustrating an example in which a synthesis unit according to the first example embodiment generates training data.

FIG. 11 is a diagram illustrating an example in which the synthesis unit 172 generates training data. As illustrated in FIG. 11, the synthesis unit 172 synthesizes the background image and the person image in such a way as to generate the training data.

The output unit 18 outputs the training data generated by the synthesis unit 172.

Figure 12:
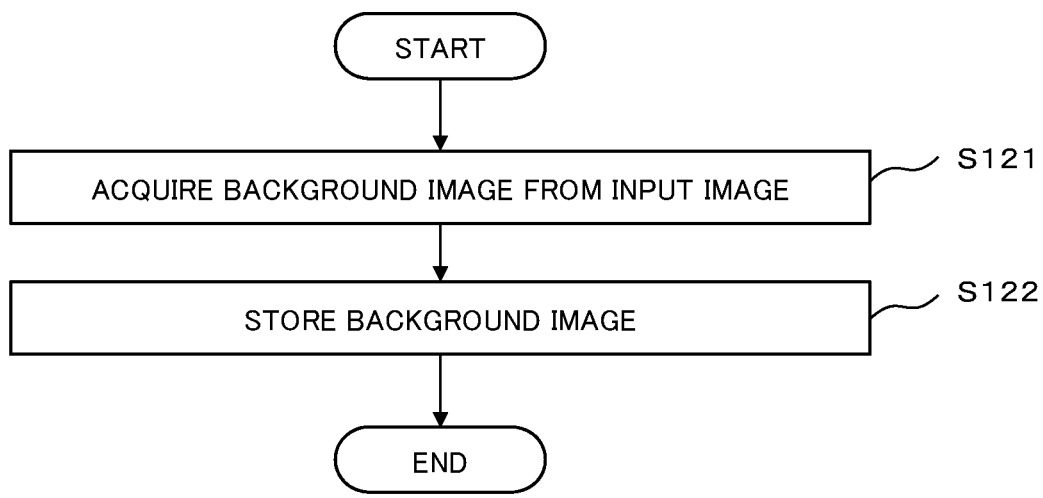
FIG. 12 is a flowchart illustrating a processing operation for acquiring and storing the background image of the image processing device according to the first example embodiment.

FIG. 12 is a flowchart for explaining a processing operation for acquiring the background image from the input image and storing the background image by the image processing device 1. Hereinafter, a flow of the processing of the image processing device 1 will be described with reference to FIG. 12.

The acquisition unit 12 acquires a background image from an input image (S121). The storage unit 13 stores the background image (S122).

Figure 13:
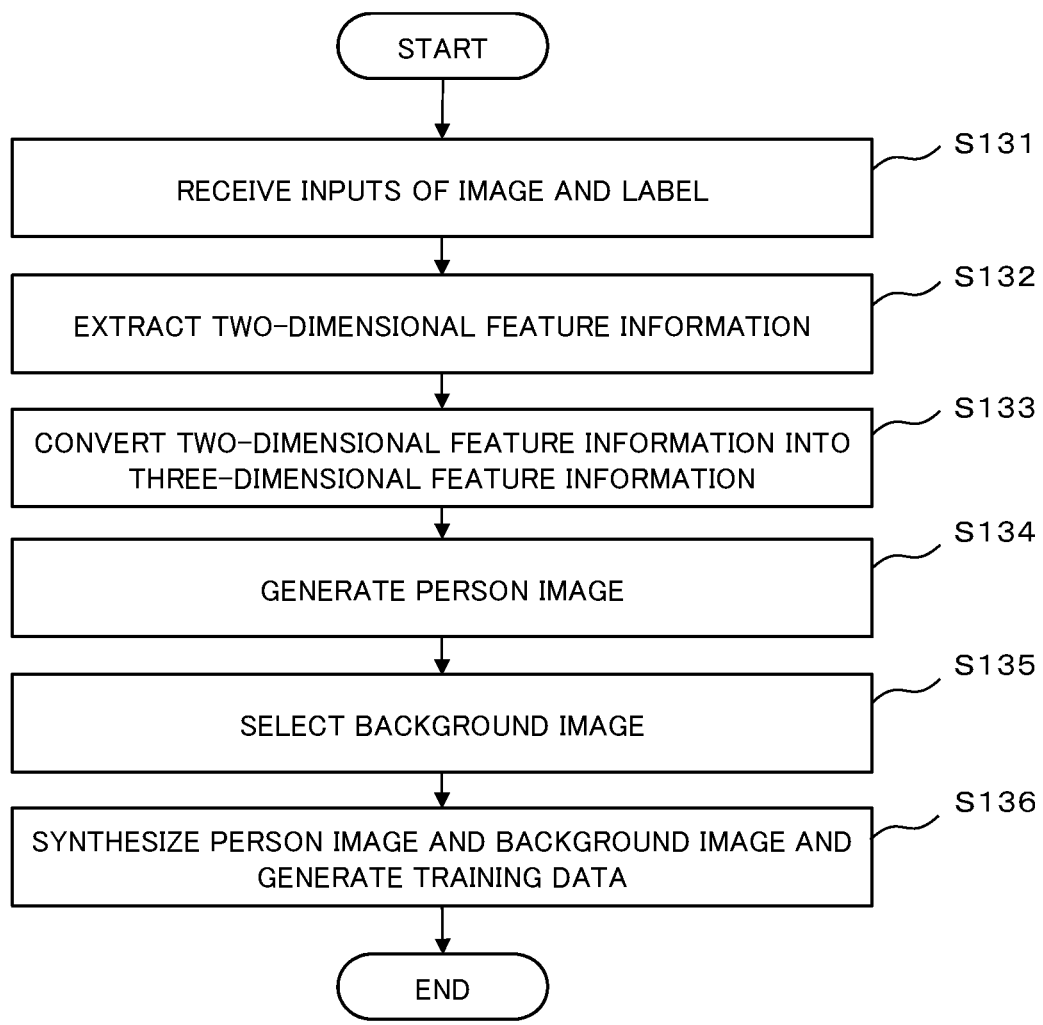
FIG. 13 is a flowchart illustrating a processing operation of the image processing device according to the first example embodiment.

FIG. 13 is a flowchart for explaining a processing operation from a time when the image processing device 1 receives inputs of an image and a label to a time when the image processing device 1 generates training data. Hereinafter, a flow of the processing of the image processing device 1 will be described with reference to FIG. 13.

The input reception unit 11 receives inputs of an image and a label (S131). The extraction unit 15 extracts a two-dimensional feature from the input image (S132). The conversion unit 16 converts the extracted two-dimensional feature into a three-dimensional feature (S133). The person image generation unit 171 generates a person image on the basis of the three-dimensional feature and a person model (S134). The selection unit 14 selects a background image used to generate training data from the storage unit 13 (S135). The synthesis unit 172 synthesizes the background image and the person image and generates the training data (S136).

Note that the selection unit 14 may execute the processing for selecting the background image at any time before the training data generation processing by the synthesis unit 172 or in parallel to the processing by the extraction unit 15, the conversion unit 16, or the person image generation unit 171.

The processing described with reference to FIG. 12 may be executed in parallel to the processing described with reference to FIG. 13.

As described above, the image processing device according to the present example embodiment converts the two-dimensional feature of the person extracted from the image into the three-dimensional feature and generates the training data. As a result, the training data can be generated at a low cost without using special equipment such as a motion capturing system.

Second Example Embodiment

A second example embodiment according to the present invention will be described in detail with reference to the drawings.

An image processing device 10 according to the present example embodiment is different from the image processing device 1 according to the first example embodiment in that the image processing device 10 according to the present example embodiment includes a three-dimensional feature generation unit 19.

Figure 14:
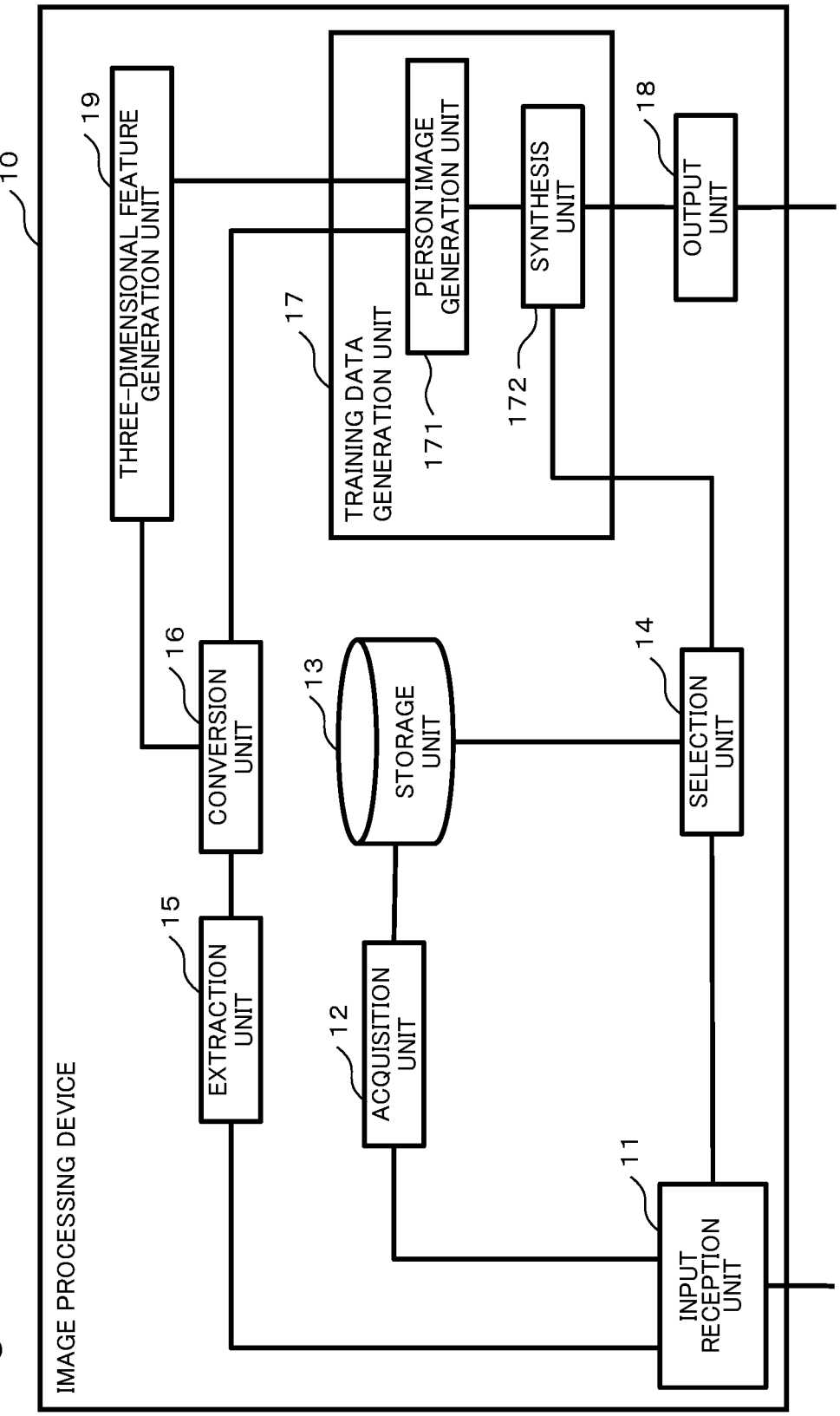
FIG. 14 is a diagram illustrating a configuration of an image processing device according to a second example embodiment.

FIG. 14 is a diagram illustrating a configuration of the image processing device 10 according to the second example embodiment.

Components of the image processing device 10 that perform the processing operations same as the components of the image processing device 1 according to the first example embodiment are respectively denoted with reference numerals same as those in FIG. 1, and detailed description thereof is omitted.

The three-dimensional feature generation unit 19 uses a three-dimensional feature obtained by a conversion unit 16 in such a way as to generate another three-dimensional feature different from the three-dimensional feature.

For example, the three-dimensional feature generation unit 19 changes the three-dimensional feature received from the conversion unit 16 on the basis of a person model and generates the another three-dimensional feature in a physical state indicated by a label. Specifically, for example, in a case where the three-dimensional feature is three-dimensional skeleton information of a human body, the three-dimensional feature generation unit 19 generates the another three-dimensional feature by changing an angle of each joint on the basis of knowledge regarding a motion range of each joint. It is preferable that the generated another three-dimensional feature be within a label applied to an image. For example, in a case where a three-dimensional feature obtained from an image to which a label "wobble" is applied is changed, it is preferable to determine a change condition in such a way that the changed three-dimensional feature also represents a "wobbling" posture.

For example, the three-dimensional feature generation unit 19 generates the another three-dimensional feature in the physical state indicated by the label using a plurality of three-dimensional features respectively obtained from a plurality of time-series images to which the same label is applied. Specifically, for example, in a case of receiving inputs of two time-series images to which the label of "wobble" is applied, the three-dimensional feature generation unit 19 generates three-dimensional skeleton information of a person at a time related to a time between imaging times of the two time-series images. Specifically, the three-dimensional feature generation unit 19 averages positional information regarding each joint or the like of a body of a person in the two time-series images in such a way as to generate a three-dimensional feature regarding the position of each joint at the time related to the time between the imaging times of the two time-series images.

The three-dimensional feature generation unit 19 can generate a three-dimensional feature at any time between images using the same principle.

Similarly, the three-dimensional feature generation unit 19 can generate a three-dimensional feature at a time outside the imaging times of the two time-series images using the three-dimensional features obtained from the two time-series images. At this time, a time interval between the two time-series images may be set in such a way that the generated three-dimensional feature is within the range of the label applied to the original image.

The three-dimensional feature generation unit 19 outputs the generated three-dimensional feature to a person image generation unit 171/

The person image generation unit 171 generates a person image on the basis of the three-dimensional feature input from the three-dimensional feature generation unit 19 and a person model.

Figure 15:
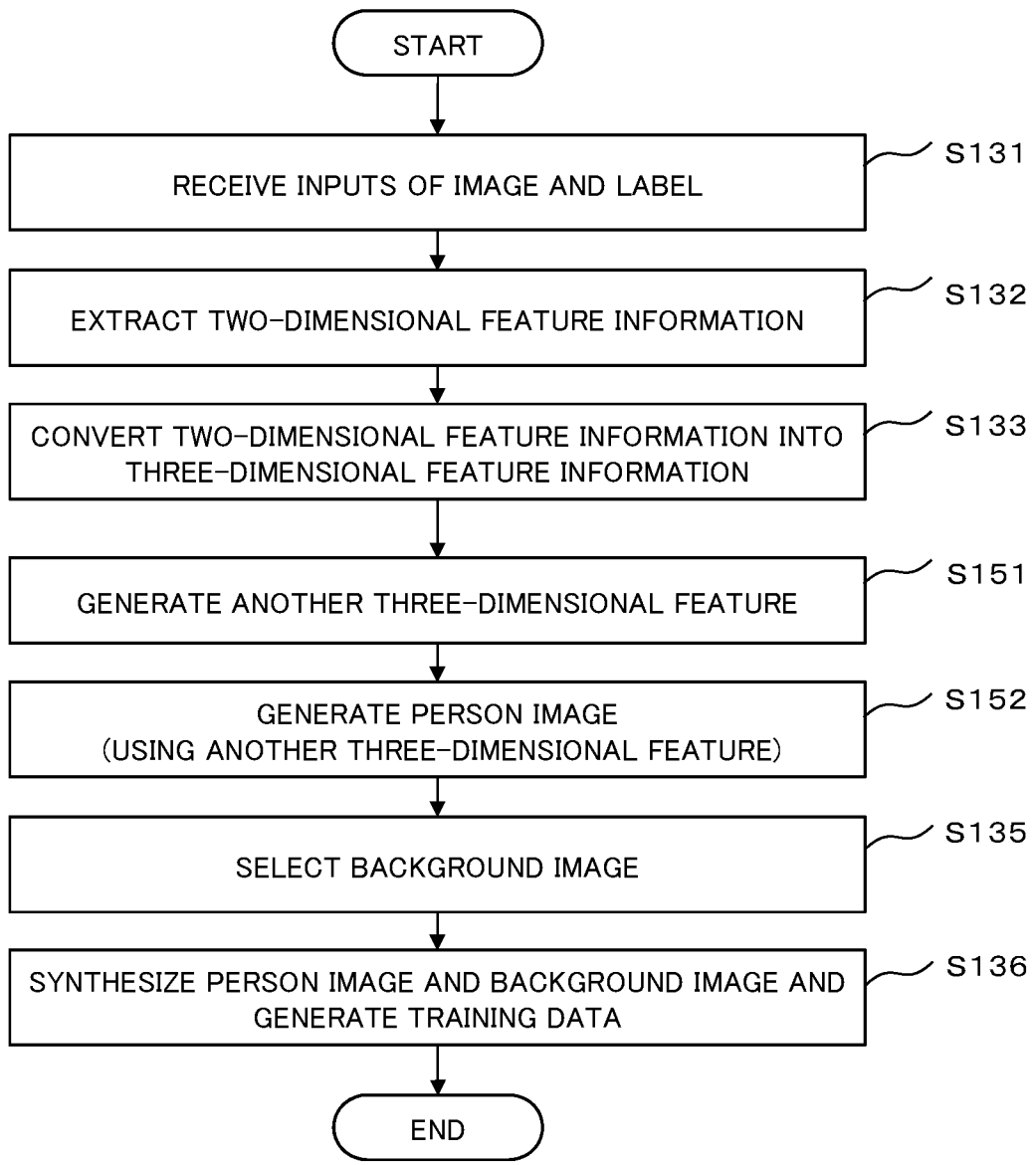
FIG. 15 is a flowchart illustrating a processing operation of the image processing device according to the second example embodiment.

FIG. 15 is a flowchart illustrating a flow of processing executed by the image processing device 10 from extraction of a two-dimensional feature to generation of training data using another three-dimensional feature generated using the three-dimensional feature. Hereinafter, a flow of a processing operation of the image processing device 10 will be described with reference to FIG. 15. Note that the processing same as that in the first example embodiment is denoted with a reference numeral similar to that in FIG. 13, and description thereof is omitted.

The three-dimensional feature generation unit 19 uses a three-dimensional feature obtained by the conversion unit 16 in such a way as to generate another three-dimensional feature different from the three-dimensional feature (S151). The person image generation unit 171 generates a person image on the basis of the another three-dimensional feature and a person model (S152).

As described above, the image processing device according to the present example embodiment generates the training data using the another three-dimensional feature generated using the three-dimensional feature obtained from the image. This, it is possible to easily increase variations of training data regarding each behavior.

Third Example Embodiment

Figure 16:
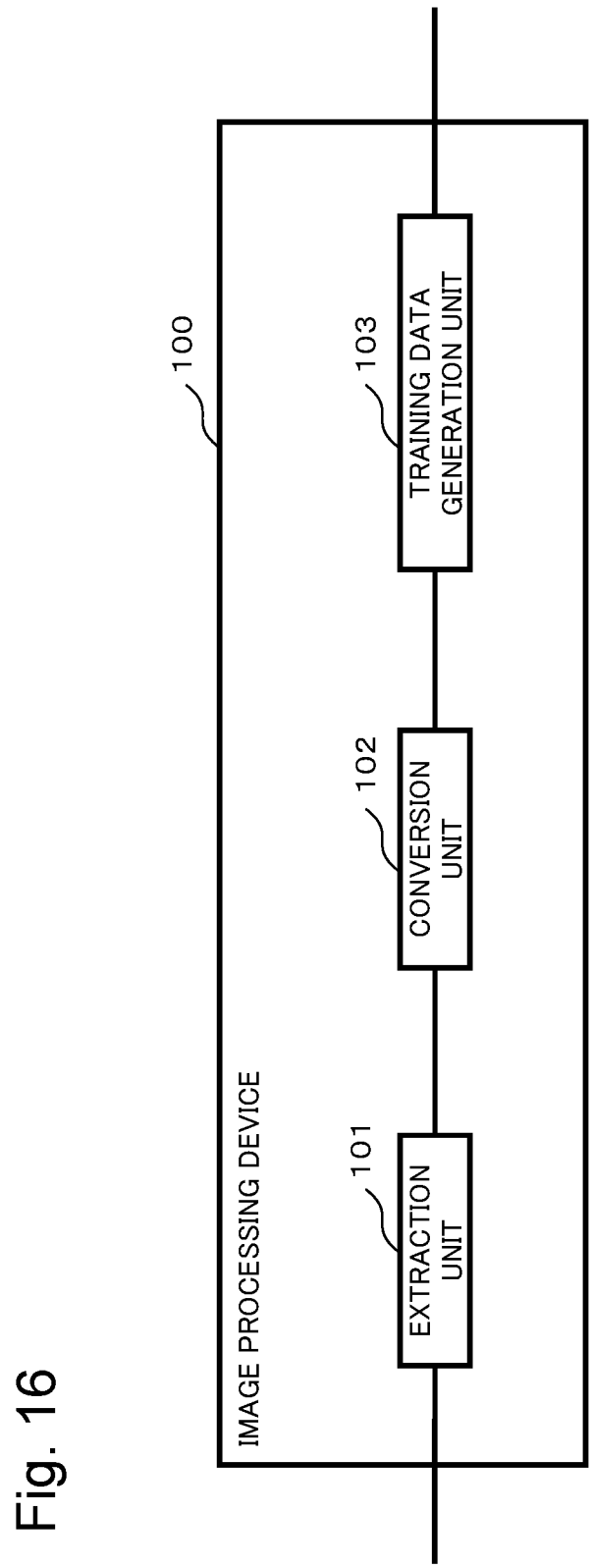
FIG. 16 is a diagram illustrating a configuration of an image processing device according to a third example embodiment.

FIG. 16 is a diagram illustrating an image processing device 100 according to the present example embodiment. Hereinafter, an outline of the image processing device 100 will be described with reference to FIG. 16.

The image processing device 100 according to the present example embodiment includes an extraction unit 101, a conversion unit 102, and a training data generation unit 103.

The extraction unit 101 extracts a two-dimensional feature regarding a part of a person in an image. The extraction unit 101 outputs the extracted two-dimensional feature to the conversion unit 102.

The conversion unit 102 converts the two-dimensional feature into a three-dimensional feature regarding a human body structure. The conversion unit 102 outputs the obtained three-dimensional feature to the training data generation unit 103.

The training data generation unit 103 generates training data using the three-dimensional feature and a label indicating a physical state of the person.

Figure 17:
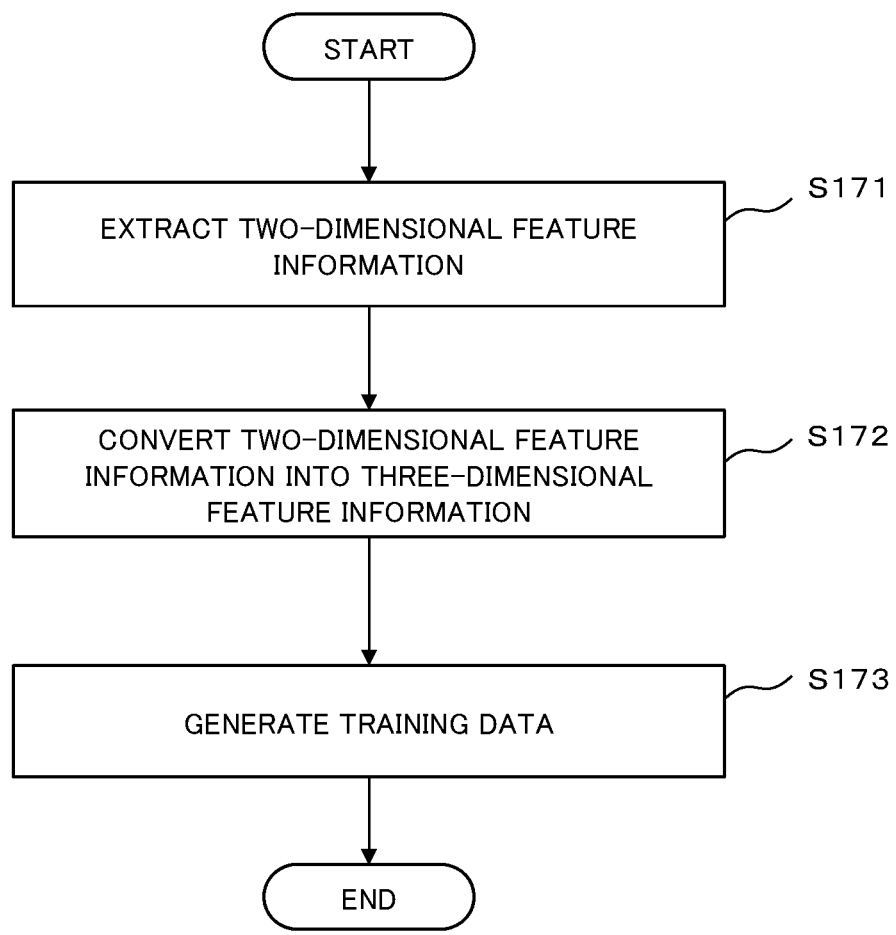
FIG. 17 is a flowchart illustrating a processing operation of the image processing device according to the third example embodiment.

FIG. 17 is a flowchart illustrating a flow of processing executed by the image processing device 100 from extraction of the two-dimensional feature to generation of the training data. Hereinafter, the flow of the processing of the image processing device 100 will be described with reference to FIG. 17.

The extraction unit 101 extracts a two-dimensional feature regarding a part of a person in an image (S171). The conversion unit 102 converts the extracted two-dimensional feature into a three-dimensional feature (S172). The training data generation unit 103 generates training data using the three-dimensional feature and a correct answer label (S173).

As described above, the image processing device according to the present example embodiment converts the two-dimensional feature of the person extracted from the image into the three-dimensional feature and generates the training data. As a result, the training data can be generated at a low cost without using special equipment such as a motion capturing system.

Hardware Configuration that Implements Each Unit of Example Embodiment

In each example embodiment of the present invention described above, a block illustrating each component of each device is illustrated in functional units. However, the blocks illustrating the components do not necessarily mean that the components are configured by separate modules.

Processing of each component may be achieved, for example, by reading and executing a program that is stored in a computer-readable storage medium and causes a computer system to execute the processing by the computer system. The "computer-readable storage medium" is, for example, a portable medium such as an optical disk, a magnetic disk, a magneto-optical disk, or a nonvolatile semiconductor memory and a storage device such as a Read Only Memory (ROM), a hard disk, or the like built in a computer system. The "computer-readable storage medium" includes a storage medium that can temporarily hold a program such as a volatile memory in the computer system and a storage medium that transmits a program such as a communication line such as a network, a telephone line, or the like. The program may implement a part of the above-described functions or may implement the functions described above by a combination with a program that has been already stored in the computer system.

Figure 18:
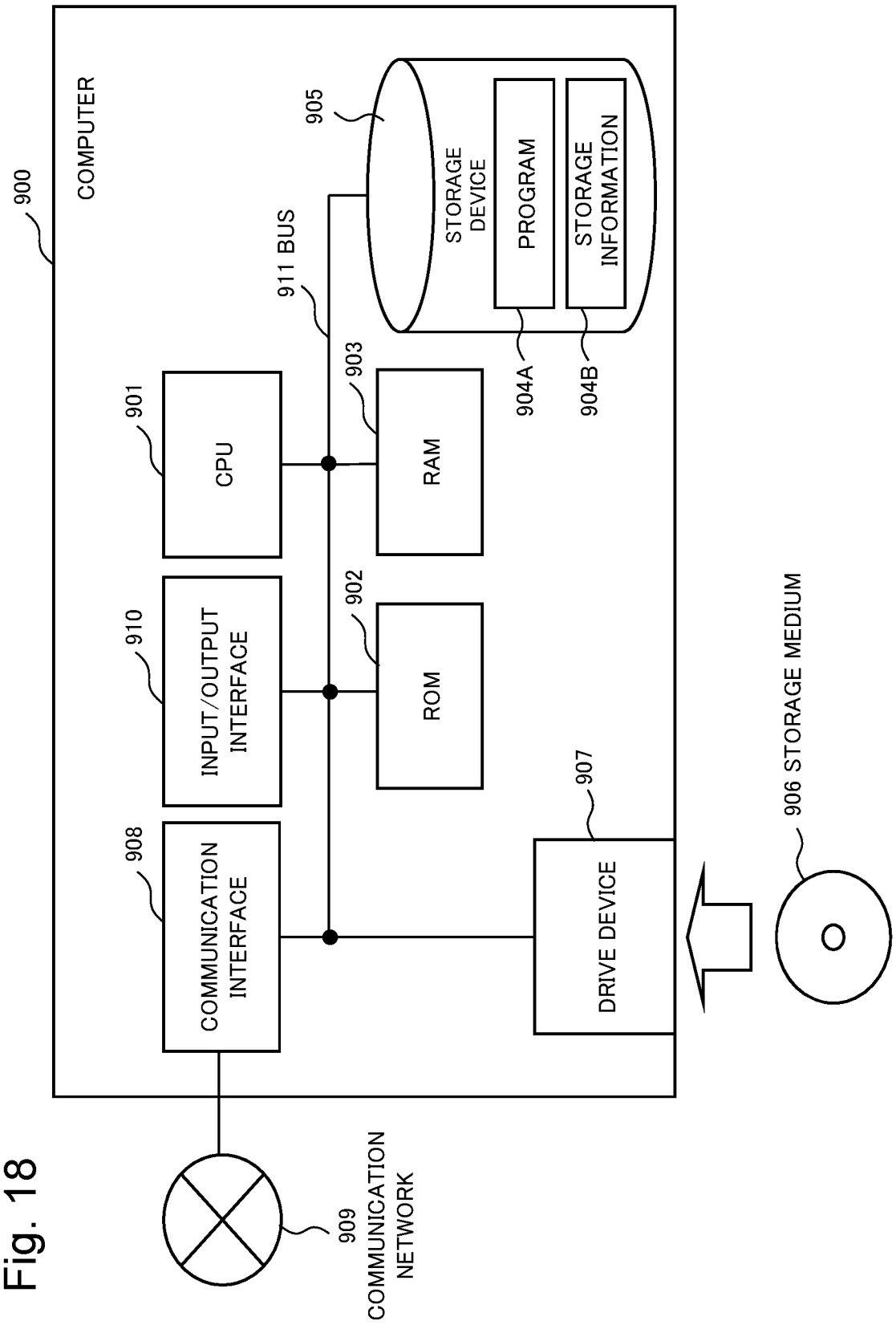
FIG. 18 is a block diagram illustrating an example of hardware for configuring each unit of each example embodiment according to the present invention.

The "computer system" is, for example, a system including a computer 900 as illustrated in FIG. 18. The computer 900 includes the following components.

One or a plurality of central processing units (CPU) 901
ROM 902
RAM (Random Access Memory) 903
Program 904A and storage information 904B loaded on RAM 903
Storage device 905 that stores program 904A and storage information 904B
Drive device 907 that reads/writes from/to storage medium 906
Communication interface 908 connected to communication network 909
Input/output interface 910 that inputs/outputs data
Bus 911 that connects components For example, each component of each device in each example embodiment is implemented by loading the program 904A for implementing the function of the component to the RAM 903 and executing the program 904A by the CPU 901. The program 904A for implementing the function of each component of each device is, for example, stored in the storage device 905 or the ROM 902 in advance. The CPU 901 reads the program 904A as necessary. The storage device 905 is, for example, a hard disk. The program 904A may be supplied to the CPU 901 via the communication network 909 or may be stored in the storage medium 906 in advance, read by the drive device 907, and supplied to the CPU 901. The storage medium 906 is a portable medium, for example, an optical disk, a magnetic disk, a magneto-optical disk, a nonvolatile semiconductor memory, or the like.

There are various modifications of the method for implementing each device. For example, each device may be implemented by a possible combination of a separate computer 900 and a program for each component. A plurality of components included in each device may be implemented by a possible combination of a single computer 900 and a program.

Some or all the components of each device may be implemented by another general-purpose or dedicated circuit, a computer, or the like or a combination of these. These may be configured by a single chip or a plurality of chips connected via a bus.

In a case where some or all of the components of each device are implemented by a plurality of computers, circuits, or the like, the plurality of computers, circuits, or the like may be centrally or dispersedly arranged. For example, the computers, the circuits, or the like may be implemented as a form, in which each of the computers, the circuits, or the like is connected via a communication network, such as a client and server system, a cloud computing system, or the like.

(Supplementary Note)

The configurations of the example embodiments described above may be combined or some components may be replaced. The configuration of the present invention is not limited to only the example embodiments described above, and may be variously changed without departing from the gist of the present invention.

Although some or all of the example embodiments may be described as supplementary notes below, some or all of the example embodiments are not limited to the following supplementary notes.

(Supplementary Note 1)

An image processing device including:

extraction means for extracting a two-dimensional feature regarding a part of a person in an image;

conversion means for converting the two-dimensional feature into a three-dimensional feature regarding a human body structure; and training data generation means for generating training data using the three-dimensional feature and a label indicating a physical state of the person.

(Supplementary Note 2)

The image processing device according to supplementary note 1, in which the conversion means converts the two-dimensional feature into the three-dimensional feature using a model learned by machine learning in advance.

(Supplementary Note 3)

The image processing device according to supplementary note 1 or 2, further including:

three-dimensional feature generation means for generating another three-dimensional feature in a physical state indicated by the label using the three-dimensional feature.

(Supplementary Note 4)

The image processing device according to supplementary note 3, in which the three-dimensional feature generation means generates the another three-dimensional feature by changing the three-dimensional feature based on a human body structure.

(Supplementary Note 5)

The image processing device according to supplementary note 3, in which the extraction means extracts a two-dimensional feature regarding a part of the person in each of a plurality of time-series images including the person, the conversion means converts the two-dimensional feature into each three-dimensional feature regarding a human body structure, and the three-dimensional feature generation means generates the another three-dimensional feature at a time different from an imaging time of each of the plurality of time-series images based on a plurality of the three-dimensional features.

(Supplementary Note 6)

The image processing device according to any one of supplementary notes 1 to 5, in which the extraction means extracts another two-dimensional feature used to supplement the two-dimensional feature from preceding and succeeding images from the image in time series in a case where a part of a human body of the person is hidden in the image.

(Supplementary Note 7)

The image processing device according to any one of supplementary notes 1 to 6, further including:

acquisition means for extracting a background image of the image;

storage means for storing the background image; and selection means for selecting a background image used to generate the training data from among the background images stored in the storage means, in which the training data generation means includes person image generation means for generating a person image in the physical state based on the three-dimensional feature, and synthesis means for synthesizing the person image and the selected background image.

(Supplementary Note 8)

The image processing device according to supplementary note 7, in which the person image generation means generates the person image based on an imaging condition of an imaging device that has imaged the image and positional relationship between the person and the imaging device, and the selection means selects a background image of an image imaged under an imaging condition similar to the imaging condition.

(Supplementary Note 9)

The image processing device according to supplementary note 7 or 8, in which the person image generation means selects a person model based on the label and generates the person image using the person model.

(Supplementary Note 10)

The image processing device according to any one of supplementary notes 7 to 9, in which the selection means selects a background image used to generate the training data from the storage means based on the label.

(Supplementary Note 11)

An image processing method including:

extracting a two-dimensional feature regarding a part of a person in an image;

converting the two-dimensional feature into a three-dimensional feature regarding a human body structure; and generating training data using the three-dimensional feature and a label indicating a physical state of the person.

(Supplementary Note 12)

A program recording medium that records a program for causing a computer to execute processing including:

processing for extracting a two-dimensional feature regarding a part of a person in an image;

processing for converting the two-dimensional feature into a three-dimensional feature regarding a human body structure; and processing for generating training data using the three-dimensional feature and a label indicating a physical state of the person.

REFERENCE SIGNS LIST

1 Image processing device
10 Image processing device
11 input reception unit
12 acquisition unit
13 storage unit
14 selection unit
15 extraction unit
16 conversion unit
17 training data generation unit
18 output unit
19 three-dimensional feature generation unit
100 Image processing device
101 extraction unit
102 conversion unit
103 training data generation unit
171 person image generation unit
172 synthesis unit
900 computer
901 CPU
902 ROM
903 RAM
904A program
904B storage information
905 storage device
906 storage medium
907 drive device
908 communication interface
909 communication network
910 input/output interface
911 bus

What is claimed is:

1. An image processing device comprising:
at least one memory storing instructions; and
at least one processor configured to access the at least one memory and execute the instructions to:
extract a two-dimensional feature regarding a part of a person from each of a plurality of time-series images including the person;
convert the two-dimensional feature from each of the plurality of time-series images into a first three-dimensional feature regarding a human body structure;
generate a second three-dimensional feature at a time different from an imaging time of each of the plurality of time-series images based on a plurality of the three-dimensional features in a physical state indicated by a label using the first three-dimensional feature, wherein the label indicates the physical state of the person; and
generate training data using the second three-dimensional feature and the label.

2. The image processing device according to claim 1, wherein
the at least one processor is further configured to execute the instructions to:
convert the two-dimensional feature into the three-dimensional feature by using a model learned by machine learning in advance.

3. The image processing device according to claim 1, wherein
the at least one processor is further configured to execute the instructions to:
generate the second three-dimensional feature by changing the first three-dimensional feature based on the human body structure.

4. The image processing device according to claim 1, wherein
the two-dimensional feature extracted from each of the plurality of time-series images is a first two-dimensional feature, and
the at least one processor is further configured to execute the instructions to:
in a case in which the part of the person is hidden in a first image of the plurality of time-series images, use the two-dimensional feature extracted from each of a second image preceding the first image in the plurality of time-series images and a third image succeeding the first image in the plurality of time-series images, as the two-dimensional feature for the first image.

5. The image processing device according to claim 1, wherein
the at least one processor is further configured to execute the instructions to:
extract a background image from each of a plurality of the time-series images;
store the background image extracted from each of the plurality of time-series images in a storage, resulting in a plurality of stored background images;
select a background image used to generate the training data from among the plurality of stored background images;
generate a person image in the physical state on based on the three-dimensional-feature; and
synthesize the person image and the selected background image.

6. The image processing device according to claim 5, wherein
the at least one processor is further configured to execute the instructions to:
generate the person image based on an imaging condition of an imaging device that has imaged the plurality of time-series images and a positional relationship between the person and the imaging device; and
select the background image extracted from the time-series image that was imaged under an imaging condition similar to the imaging condition on which basis the person image was generated.

7. The image processing device according to claim 5, wherein
the at least one processor is further configured to execute the instructions to:
select a person model based on the label; and
generate the person image using the person model.

8. The image processing device according to claim 5, wherein
the at least one processor is further configured to execute the instructions to:
select a background image used to generate the training data from the storage based on the label.

9. An image processing method comprising:
extracting, by a processor, a two-dimensional feature regarding a part of a person from each of a plurality of time-series images including the person;
converting, by the processor, the two-dimensional feature from each of the plurality of time-series images into a first three-dimensional feature regarding a human body structure;
generating, by the processor, a second three-dimensional feature at a time different from an imaging time of each of the plurality of time-series images based on a plurality of the three-dimensional features in a physical state indicated by a label using the first three-dimensional feature, wherein the label indicates the physical state of the person; and
generating, by the processor, training data using the second three-dimensional feature and the label.

10. A non-transitory computer-readable program recording medium that stores a program that when executed by a computer causes the computer to perform:
extracting a two-dimensional feature regarding a part of a person from each of a plurality of time-series images including the person;
converting the two-dimensional feature from each of the plurality of time-series images into a first three-dimensional feature regarding a human body structure;
generating, a second three-dimensional feature at a time different from an imaging time of each of the plurality of time-series images based on a plurality of the three-dimensional features in a physical state indicated by a label using the first three-dimensional feature, wherein the label indicates the physical state of the person; and
generating training data using the second three-dimensional feature and the label.

* * * * *